United States Patent [19]
Beckett et al.

[11] Patent Number: 5,820,912
[45] Date of Patent: Oct. 13, 1998

[54] FAT-CONTAINING PRODUCT STRUCTURE AND PREPARATION THEREOF

[75] Inventors: Stephen Thomas Beckett, Wigginton; Mark Julians Bagby Jury, Thirsk, both of England; Malcolm Robert Mackley, Crescent, United Kingdom

[73] Assignee: Nestec S.A., Vevey, Switzerland

[21] Appl. No.: 741,212

[22] Filed: Oct. 29, 1996

[30] Foreign Application Priority Data

Oct. 31, 1995 [GB] United Kingdom ............... 9522303
Aug. 23, 1996 [GB] United Kingdom ............... 9617650

[51] Int. Cl.⁶ .................................. A23P 1/12
[52] U.S. Cl. .................. 426/516; 426/100; 426/103; 426/282; 426/284; 426/512; 426/514; 426/660
[58] Field of Search ................... 426/100, 103, 426/249, 279, 282, 660, 514, 516, 512, 280, 284

[56] References Cited

U.S. PATENT DOCUMENTS

| | | | |
|---|---|---|---|
| 1,492,600 | 5/1924 | Laskey | 426/514 |
| 1,518,587 | 12/1924 | Laskey | 426/514 X |
| 1,556,617 | 10/1925 | Laskey | 426/514 X |
| 1,628,251 | 5/1927 | Laskey | 426/514 X |
| 1,649,307 | 11/1927 | Hunter | 426/516 |
| 3,307,503 | 3/1967 | Elmer, Jr. et al. | 426/516 |
| 3,824,196 | 7/1974 | Benbow et al. | 502/80 |
| 4,468,185 | 8/1984 | Jansen | 426/512 X |
| 4,563,358 | 1/1986 | Mercer et al. | 426/516 X |
| 4,834,635 | 5/1989 | Groen | 426/516 X |
| 5,000,969 | 3/1991 | Beer | 426/101 |
| 5,378,483 | 1/1995 | Fazio et al. | 426/282 |
| 5,439,695 | 8/1995 | Mackey | 426/516 |

FOREIGN PATENT DOCUMENTS

| | | |
|---|---|---|
| 0603467 | 6/1994 | European Pat. Off. . |
| 0653285 | 5/1995 | European Pat. Off. . |
| 183337 | 7/1922 | United Kingdom . |
| 241552 | 6/1926 | United Kingdom . |
| 494933 | 11/1938 | United Kingdom . |
| 513167 | 10/1939 | United Kingdom . |
| 1009047 | 11/1965 | United Kingdom . |
| 2186836 | 8/1987 | United Kingdom . |
| 2270828 | 3/1994 | United Kingdom . |
| 95/26640 | 10/1995 | WIPO . |

OTHER PUBLICATIONS

Beckett et al., "The Cold Extrusion of Chocolate", Food and Bioproducts Processing, Transactions of the Institute of Chemical Engineers, Part C, vol. 72, No. Ca, pp. 47–54, Mar. 1994.

*Primary Examiner*—Milton Cano
*Attorney, Agent, or Firm*—Vogt & O'Donnell, LLP

[57] ABSTRACT

A fat-containing confectionery material is passed through an extruder and to and through a flow-constriction die to obtain an extrudate from the die so that the material passed through the extruder and die and so that the extrudate from the die are at a temperature so that the material and extrudate are in a non-pourable state and so that the material passed to the die plastically deforms, and the material is passed by pins positioned in the die so that the extrudate obtained from the die has passages which extend transversely to an extrudate cross-section to obtain a product structure having the passages.

13 Claims, 2 Drawing Sheets

FAT-CONTAINING PRODUCT STRUCTURE AND PREPARATION THEREOF

BACKGROUND OF THE INVENTION

The present invention relates to preparation of a chocolate or fat-containing confectionery material having "air pockets" which provide a distinct structure, as well as to a confectionery or food product comprising a structured chocolate or fat-containing confectionery material, as one component, contained or dispersed within or partially within a continuous phase of a further chocolate or fat-containing confectionery material or other food material.

In the art, "aerated" chocolate is known and has randomly spaced air pockets. The air pockets in normal aerated chocolate are formed by the use of super- or sub-atmospheric pressure and the production process requires expensive, complex machinery using gas under pressure, e.g. $CO_2$, or vacuum-chamber equipment. In contrast, hollow chocolate products containing one or more passages may be prepared by extrusion of molten or pumpable chocolate as described in PCT International Patent Application Publication No. WO 95/26640 and UK Patent Application Publication No. GB 2 186 836.

SUMMARY OF THE INVENTION

In this invention, "structured" chocolate or other fat-containing confectionery material (herein referred to solely as "chocolate or fat-containing confectionery material") should be understood to refer to a chocolate or fat-containing confectionery material having a continuous structure determined by an extrusion die, with a plurality of continuous longitudinal spaces or passages, which may be cellular or honeycombed in arrangement, and is distinguished from the randomly spaced air pockets of "aerated" chocolate, as described above, and the bite-characteristics, mouth-feel and texture of structured chocolate are different from that of aerated chocolate.

We have found surprisingly that structured chocolate or fat-containing confectionery material in the form of a continuous mass having longitudinal passages may be obtained easily and cheaply by extrusion of a chocolate or fat-containing confectionery material in a solid state by an extrusion method such as that described in European Patent Application Publication No. 0 603 467, the contents of which are incorporated in the present specification, or by extrusion through dies typically used for producing pasta shapes, other extrudable food products, rubber or ceramics as known in the art. In order to obtain the longitudinal passages in the extrudate, two or more solid longitudinal partitions or forming pins (both of which are hereinafter referred to as "forming" pins) are fixed in the flow constriction.

According to the present invention there is provided a process for producing a structured chocolate or fat-containing confectionery material which comprises feeding a chocolate or a fat-containing confectionery material into an extrusion device and applying pressure to the chocolate or fat-containing confectionery material upstream of a flow constriction provided with a plurality of forming pins to extrude the chocolate or fat-containing confectionery material in the form of a continuous mass having substantially longitudinal passages characterised in that the chocolate or fat-containing confectionery material is extruded in a solid or semi-solid non-pourable or non-flowable state.

The present invention also provides a confectionery or food product structure comprising a structured chocolate or fat-containing confectionery material prepared in accordance with the process of the present invention.

The present invention further provides a composite confectionery or food product structure comprising a structured chocolate or fat-containing confectionery material as one component in combination with at least one further confectionery or food material and a product wherein the structured product is contained or dispersed within or partially within a continuous phase of a further chocolate or fat-containing confectionery material or other food material.

DETAILED DESCRIPTION OF THE INVENTION

In and for practice of the present invention, the flow constriction may include a die having an inlet zone comprising a plurality of discrete channels extending from the rear of the die in the direction of the face of the die to an outlet zone having an outlet profile conforming to the desired shape of the structured chocolate or a fat-containing confectionery material, the aggregate cross-sectional area of the outlet profile being sufficiently less than that of the discrete channels in the inlet zone and whereby material entering the inlet channels coalesces inside the die to emerge from the outlet profile communicating with the discrete channels. The outlet profile may have the configuration of a series of parallel slots intersecting at right angles such as are described in U.S. Pat. No. 3,824,196 to Benbow et al. which describes a die suitable for extruding materials for making refractory catalyst supports in the form of blocks of ceramic having parallel through passages.

The extrusion is preferably carried out by applying pressure to the chocolate or fat-containing confectionery material in a solid or semi-solid non-pourable form whereby the temperature, pressure, contraction ratio and extrusion rate are such that it remains in a solid or semi-solid non-pourable form during extrusion and which has a temporary flexibility or plasticity after extrusion, e.g. as described in the afore-noted European '467 Application. The temporary flexibility or plasticity may last for up to four hours or more, e.g. from 1 minute to 2 hours, and more usually from 5 minutes to 2 hours.

As described in the European '467 Application, the extrusion process comprises feeding a fat-containing confectionery material into an extruder and applying pressure to the fat-containing confectionery material in a substantially solid or semi-solid non-pourable form upstream of a flow constriction at a temperature at which the fat-containing confectionery material is extruded substantially isothermally and remains in a solid or semi-solid non-pourable form to produce an axially homogeneous extruded product having a cross-section which is of substantially a same profile as the die exit of the extruder.

As also set forth in the '467 Application, "substantially isothermally" means that the temperature of the fat-containing confectionery material remains substantially unchanged under the conditions of the extrusion from the input to the outlet of the flow constriction if there is no external heating or cooling means. The use of external heating or cooling means, however, is not excluded as long as the material being extruded remains in a substantially solid or semi-solid non-pourable state throughout the extrusion from the input to the outlet of the flow constriction. In other words, the temperature of the fat-containing confectionery material is not caused to increase substantially by the extrusion process itself. The physical state of the fat-containing confectionery material is such that its general deformation behavior during extrusion is of plastic nature rather than that of a viscous fluid. Additionally, an important feature of the extrusion process is that for a given die configuration and material composition, the extrusion rate is weakly dependent upon the extrusion pressure.

The flow constriction may be any narrowing of the cross-sectional area of a conduit but it is usually a die, and extrusion can be generated by a differential pressure across the flow constriction. This may be established, for example, by a ram extruder conveniently operating at a controlled rate or pressure. The extruder may be, for example, a DAVENPORT extruder, a constant pressure extruder, a single-screw extruder, a twin-screw extruder or CONFORM machine.

The extrusion process necessarily includes a form of deformation between the input and outlet of the extrusion system. The convergence or contraction ratio into any extrusion orifice is preferably greater than 1.5 where the convergence or contraction ratio is defined as the ratio of the inlet area to the minimum cross-sectional area of the die for a simple cylindrical extrusion geometry.

During extrusion, it is important that the fat-containing confectionery material does not become pourable and the extrusion temperature and pressure should be maintained below a level where this may happen. Thus, although the fat-containing confectionery material may be fed into the barrel of the extruder in the liquid or paste form, it preferably is fed into the barrel in the solid or semi-solid form, and the material is extruded in a solid or semi-solid non-pourable form. The fat-containing confectionery material may be in a granular or continuous form. When in granular form, the granular nature of the fat-containing confectionery material appears to be lost during extrusion to give an essentially uniform material.

In the present invention, the longitudinal passage or passages of the structured chocolate or fat-containing confectionery material may contain air, but if desired, they may be filled with one or more materials such as liquid, semi-solid or solid confectionery materials which may, if desired, differ visually or texturally from the structured chocolate or fat-containing confectionery material, but may in fact be chocolate. Examples of such other materials present in the longitudinal passage or passages of the structured chocolate or fat-containing confectionery material include praline, truffle, mousse, fondant, caramel, flavours, colours or any combination thereof.

The composite confectionery or food product of the present invention may be prepared, for example, by co-extrusion of the further confectionery material simultaneously with the extrusion of the chocolate or fat-containing confectionery material. Alternatively, extrusion of one material may be carried out consecutively after manufacture of the other material and assembled manually or automatically to give the composite product.

The structured chocolate may be, for instance, plain, white or milk chocolate.

Structured fat-containing confectionery materials may include sugar, milk-derived components, and fat and solids from vegetable or cocoa sources in differing proportions having a moisture content less than 10%, more usually less than 5% by weight. They may be chocolate substitutes containing direct cocoa butter replacements, stearines, coconut oil, palm oil, butter or any mixture thereof; nut pastes such as peanut butter and fat; praline; confectioner's coatings used for covering cakes usually comprising chocolate analogues with cocoa butter replaced by a cheaper non-tempering fat; or CARAMAC sold by Nestle comprising non-cocoa butter fats, sugar and milk.

The further confectionery or other food material present in the composite product of the present invention may be, for instance, ice cream, mousse, praline, fondant, marshmallow, wafer, biscuit or a chocolate or fat-containing confectionery material such as cake or pastry which may, if desired, differ visually or texturally from the structured chocolate or fat-containing confectionery material. For example, if the structured chocolate or fat-containing confectionery material is made of a dark chocolate, the further confectionery material may be white chocolate.

The structured chocolate or fat-containing confectionery material and the further confectionery material may be arranged in any physical combination, e.g. they may be arranged in layers or either one may be encased by the other. There may be more than one layer of structured chocolate or fat-containing confectionery material and there may be more than one layer of one or more further confectionery or food materials. In addition, in the composite product, the substantially longitudinal passages of the structured chocolate or fat-containing confectionery material may be filled with one or more materials such as liquids, semi-solid, or solid confectionery materials. It will be appreciated that the cross-sectional area of the air passages will normally need to be larger for filling with more viscous liquids and solid or semi-solid confectionery materials than for filling with lower viscosity liquids.

The use of structured chocolate according to the present invention in contrast to normal aerated chocolate, in which the air pockets are formed randomly and are not of the same size, gives advantages, examples of which are as follows:

a) the substantially longitudinal passages of the structured chocolate or fat-containing confectionery material may be filled with one or more materials, whereas the air pockets of normal aerated chocolate cannot be filled with other materials.

b) the shape and visual appearance can be very easily controlled exactly as desired, by appropriate die design. For instance, the cross-sectional shape, size and number of the air passages may be controlled by the appropriate form of the die, e.g. the number, size and shape of the forming pins. In particular, the cross-sectional area of the air passages can be controlled so that they all have the same size, which is not possible for the air pockets of normal aerated chocolate. It is possible to have a cross-sectional width of up to 10 mm or 40 mm or even more. In fact, any width is possible with appropriate die design and a suitable extruder. For example, the cross-sectional width of the air passages may be from 2 to 5 mm but could be larger for a small number of single channels filled with ice cream. It is also possible to have extremely thin or thick channels or walls, e.g. from 0.2 to 20 mm or more.

Further in contrast to the air pockets in normal aerated chocolate which have a distribution of size and wall thickness, and are essentially randomly positioned, it should be understood that the air passages of structured chocolate may also be formed with different sizes, but in a controlled manner rather than essentially randomly as with normal aerated chocolate.

The present invention is illustrated further, by way of example only, with reference to the accompanying drawings.

DETAILED DESCRIPTION OF THE DRAWINGS

Figure 1:
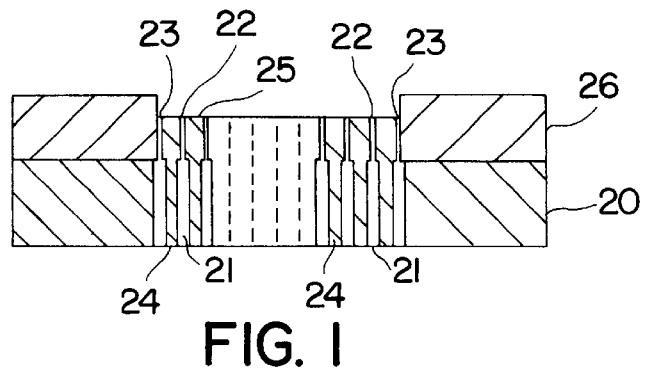
FIG. 1 is a sectional elevation of a die for use in the present invention together with the outer slot.
Figure 2:
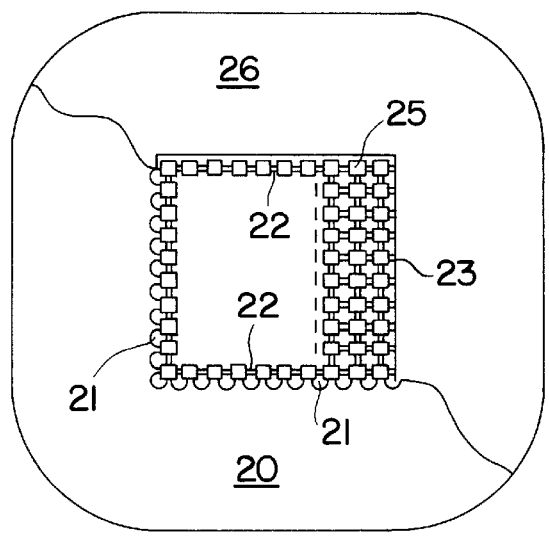
FIG. 2 is a plan view of the die of FIG. 1 with a cut-away partial view of the outer slot.

Referring to FIGS. 1 and 2 of the drawings, a die 20 is formed with a series of circular section discrete channels 21, inner slots 22 and outer slots 23. The channels 21 are bounded by partitions 24 and the slots 22 are bounded by separator blocks 25. The outer slots 23 are bounded by a block 26. The slots in the drawings are linear and positioned along mutually parallel perpendicular lines in the die. The total cross-sectional area of the discrete channels 21 is greater than that of the slots 22 and 23 in order to ensure that sufficient chocolate is supplied to fill the slots.

The slots can be linear or arcuate in cross-section. They may be perpendicular or at an angle. When linear, they may be parallel or diagonal to the sides of the separator blocks 25. The outer slots 23 may be square, circular or elliptical in shape to provide a continuous mass with an outer square, circular or elliptical shape.

In operation, the solid plain chocolate at 25° C. is extruded at 50 bars through the die 20 and travels through the discrete channels 21 and through the slots 22, 23 to emerge as continuous profile of structured chocolate having longitudinal passages which are filled with air and which extend transversely to the extrudate cross-section.

A composite product consisting of structured plain chocolate enrobed by praline is prepared by co-extruding solid chocolate and praline through an extruder comprising a die as shown in FIGS. 1 and 2 of the drawings through which the solid chocolate is extruded surrounded by an annular channel through which the praline is extruded.

Figure 3:
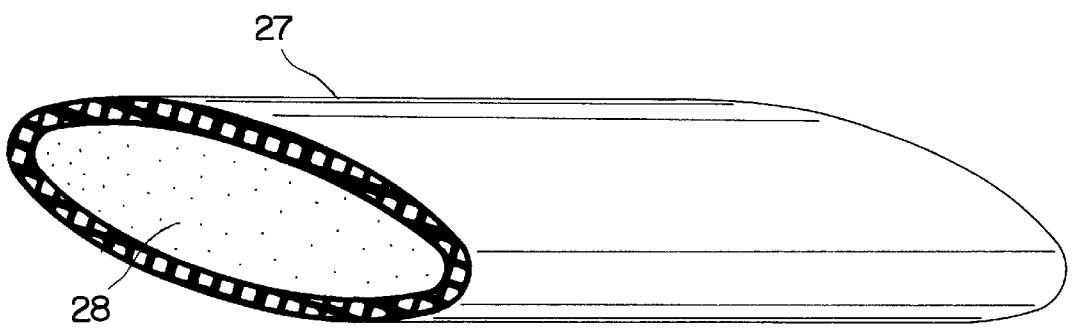
FIG. 3 is a perspective view of a composite product of the present invention comprising a structured milk chocolate tube containing ice cream.

FIG. 3 illustrates a product comprising a milk chocolate tube 27 containing ice cream 28 which is manufactured separately, and the two products are assembled together.

Figure 4:
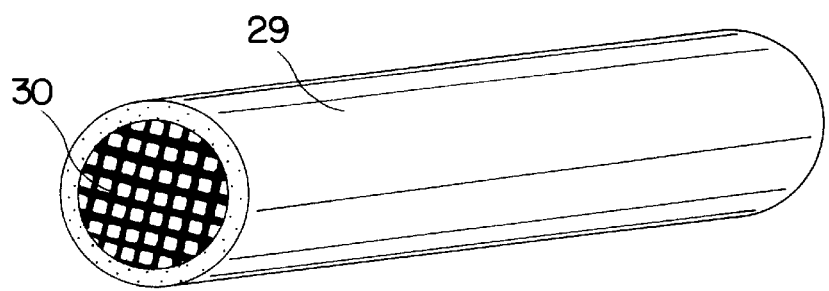
FIG. 4 is a perspective view of a composite product of the present invention comprising an extruded white chocolate tube encasing extruded structured milk chocolate.

FIG. 4 illustrates a product comprising an extruded white chocolate tube 29 encasing structured milk chocolate 30 extruded using a die based on the die shown in FIGS. 1 and 2.

Figure 5:
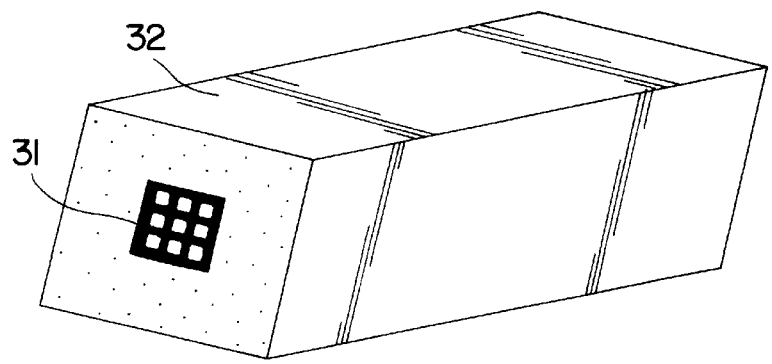
FIG. 5 is a perspective view of a composite product of the present invention comprising structured chocolate encased by ice cream.

FIG. 5 illustrates a product comprising structured chocolate 31 extruded using the die shown in FIGS. 1 and 2 encased by ice cream 32.

Figure 6:
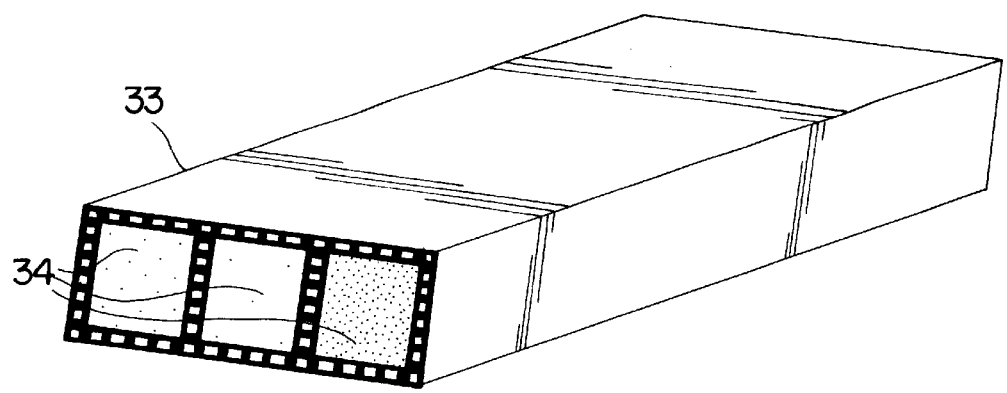
FIG. 6 is a perspective view of a composite product of the present invention comprising structured chocolate with three filled passages.

FIG. 6 illustrates a product comprising structured milk chocolate 33 extruded according to the present invention with three passages filled with other confectionery fillings, praline, truffle and mousse 34.

We claim:

1. In a process for preparing a food article which comprises a fat-containing confectionery material wherein the fat-containing material is fed into an extruder and pressure is applied to the material to pass the material through the extruder and through a flow-constriction die to obtain an extrudate from the die so that the material and the extrudate are in a non-pourable state in which the material plastically deforms, an improvement consisting essentially of the steps of passing the material in the extruder, wherein the extruder has pins positioned in the die, so that passages are formed within the material passed by the pins so that the extrudate obtained from the die comprises passages which extend transversely to an extrudate cross-section and obtaining the extrudate comprising the passages to obtain a product structure having the passages.

2. In a process for preparing a food article which comprises a fat-containing confectionery material wherein the fat-containing material is fed into an extruder and pressure is applied to the material to pass the material through the extruder and through a flow-constriction die to obtain an extrudate from the die so that the material and the extrudate are in a non-pourable state in which the material plastically deforms, an improvement comprising the steps of passing the material in the extruder, wherein the extruder has pins positioned in the die which define a plurality of channels and a plurality of slots which extend from the channels so that a cross-section of the material decreases upon passage from the channels to the slots, so that passages are formed within the material passed by the pins so that the extrudate obtained from the die comprises passages which extend transversely to an extrudate cross-section and obtaining the extrudate comprising the passages to obtain a product structure having the passages.

3. A process according to claim 1 or 2 wherein a further improvement comprises combining the product structure obtained with a second food material which differs from the product structure material to obtain a composite product.

4. A process according to claim 1 or 2 wherein a further improvement comprises introducing a second food material which differs from the product structure material into the passages of the product structure obtained to obtain a composite product.

5. A process according to claim 1 or 2 wherein the fat-containing confectionery material is selected from the group consisting of a chocolate, of a chocolate substitute comprising a cocoa butter replacement and of a chocolate analog comprising a cocoa butter replacement.

6. A process according to claim 3 wherein the fat-containing confectionery material is selected from the group consisting of a chocolate, of a chocolate substitute comprising a cocoa butter replacement and of a chocolate analog comprising a cocoa butter replacement.

7. A process according to claim 6 wherein the second, different fat-containing confectionery material is selected from the group consisting of ice cream, mousse, praline, fondant and marshmallow.

8. A process according to claim 3 wherein the second, different food material is a fat-containing confectionery material which differs from the product structure material.

9. A process according to claim 8 wherein the second, different fat-containing confectionery material is selected from the group consisting of ice cream, mousse, praline, fondant and marshmallow.

10. A process according to claim 4 wherein the fat-containing confectionery material is selected from the group consisting of a chocolate, of a chocolate substitute comprising a cocoa butter replacement and of a chocolate analog comprising a cocoa butter replacement.

11. A process according to claim 10 wherein the second, different fat-containing confectionery material is selected from the group consisting of ice cream, mousse, praline, fondant and marshmallow.

12. A process according to claim 4 wherein the second, different food material is a fat-containing confectionery material which differs from the product structure material.

13. A process according to claim 12 wherein the second, different fat-containing confectionery material is selected from the group consisting of ice cream, mousse, praline, fondant and marshmallow.

* * * * *